Figure 1:
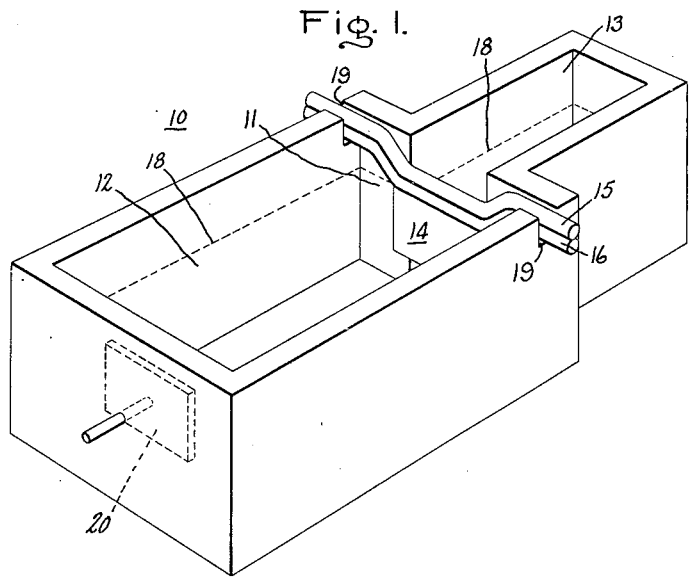

Nov. 3, 1953

G. C. NONKEN 2,658,094

COMBINED ELECTRODE AND SKIMMER FOR
ELECTRIC GLASS MELTING FURNACES

Filed May 10, 1950

3 Sheets-Sheet 1

Inventor:
Gordon C. Nonken,
by Claude A. Mott.
His Attorney.

Nov. 3, 1953

G. C. NONKEN 2,658,094

COMBINED ELECTRODE AND SKIMMER FOR
ELECTRIC GLASS MELTING FURNACES

Filed May 10, 1950

3 Sheets-Sheet 2

Inventor:
Gordon C. Nonken,
by Claude W. Mott.
His Attorney.

Nov. 3, 1953

G. C. NONKEN 2,658,094

COMBINED ELECTRODE AND SKIMMER FOR
ELECTRIC GLASS MELTING FURNACES

Filed May 10, 1950

3 Sheets-Sheet 3

Inventor:
Gordon C. Nonken,
by Claude H. Mott
His Attorney.

Patented Nov. 3, 1953

2,658,094

UNITED STATES PATENT OFFICE 2,658,094

COMBINED ELECTRODE AND SKIMMER FOR ELECTRIC GLASS MELTING FURNACES

Gordon C. Nonken, Pittsfield, Mass., assignor to General Electric Company, a corporation of New York Application May 10, 1950, Serial No. 161,098

4 Claims. (Cl. 13—6)

This invention relates to continuous type furnaces for the production of glass, and more particularly to skimmers and electrodes for such furnaces.

In the production of glass on a continuous basis, an elongated furnace having two or more compartments is customarily used. The raw materials from which the glass is to be made are inserted at one end, and after being melted and refined, the molten glass is withdrawn from the furnace at the other end. Intermediate the two ends of the furnace, one or more baffles are commonly used to divide the furnace into compartments which may be held at different temperatures to properly refine the glass. Such baffles are also useful as skimmers to prevent the flow of impurities and incompletely melted portions of the charge along the surface of the molten glass toward the discharge end of the furnace, and for this purpose they may be arranged to permit the molten glass to flow only along the lower portion of the furnace chamber below the baffles while preventing the flow of the upper strata of the charge. Continuous glass melting furnaces may be of the fuel fired type which is heated by the combustion of fuel over the top of the charge, or the electrical type which is heated by the passage of current in the glass between electrodes immersed in the charge, or a combination of these two.

Fuel fired furnaces commonly have brick dams or baffles separating the various compartments of the furnace and serving as skimmers. These baffles are provided with openings, usually close to the bottom of the furnace, which allow molten glass to go from one compartment to another. Such a baffle generally is composed of a double wall of bricks or other refractory material with an air duct between the two walls so that air may be circulated through the duct to keep one side of the bricks cool. This is done in order to increase the life of the bricks which is usually relatively short at the high temperatures encountered in glass melting furnaces. Such a brick skimmer may be two to three feet in thickness.

In electric glass melting furnaces the electrodes are usually immersed directly in the charge in the melting and refining compartments, for molten glass is a relatively good conductor of electricity even though glass in solid form is an insulator. This arrangement heats the glass more uniformly than the use of fuel burned over the surface of the glass, hence it is possible to use smaller electric furnaces than the fuel fired type to melt a given quantity of glass per unit time. In many cases when electric heating has been used, the furnace construction has remained otherwise similar to that used in fuel fired furnaces; that is, the baffles and skimmers have been constructed of refractory material in accordance with the practice in fuel fired furnaces, while the electrodes have been installed in the various compartments separately from the skimmers.

It is an object of my invention to provide a combined electrode and skimmer which provides improved features, both as an electrode and as a skimmer.

More specifically, it is an object of the invention to provide a combined skimmer and electrode of relatively small dimensions to enable the entire furnace to be made smaller.

A still further object is the provision of a combined electrode and skimmer having a longer life than skimmers heretofore used.

Still another object is to provide a skimmer which protects the side walls of the furnace near the skimmer from the effects of the intense heat of the molten glass and thereby increases the life of these side walls.

Other objects and features of my invention will become apparent from the subsequent detailed description, while the distinctive features which characterize the invention are pointed out in the appended claims.

In carrying out my invention in one preferred form thereof, I provide a flat sheet of heat resistant metal positioned transversely in a continuous glass melting furnace across the path of flow of the molten glass, with an opening provided beneath the flat sheet of metal to allow for the flow of molten glass. The top of this sheet of metal is submerged slightly below the surface of the molten glass and to this edge is secured a length of hollow metal tubing of a metal having high resistance to oxidization by the atmosphere at elevated temperatures. The tubing, which is arranged for the continuous circulation of a cooling fluid through it, is partially submerged in the molten glass across the effective width of the skimmer and extends transversely over the sides of the furnace to provide means for supporting the skimmer in the furnace.

Figure 2:
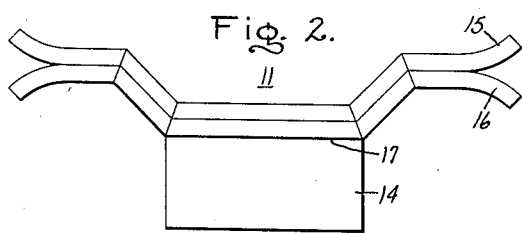
Figure 3:
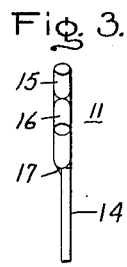
Figure 4:
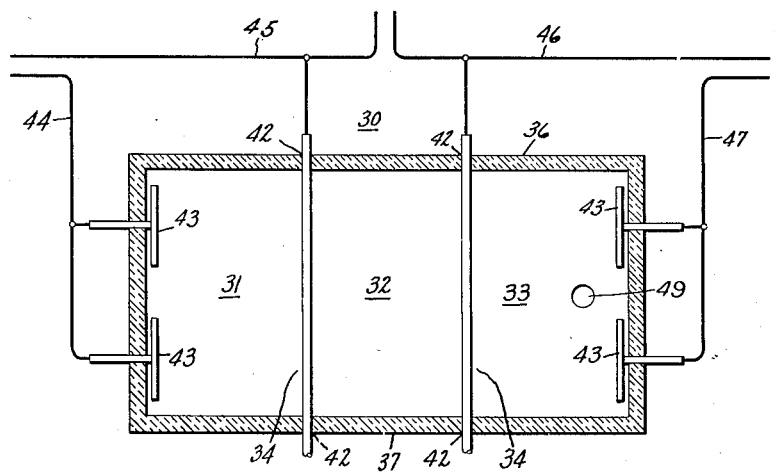
Figure 5:
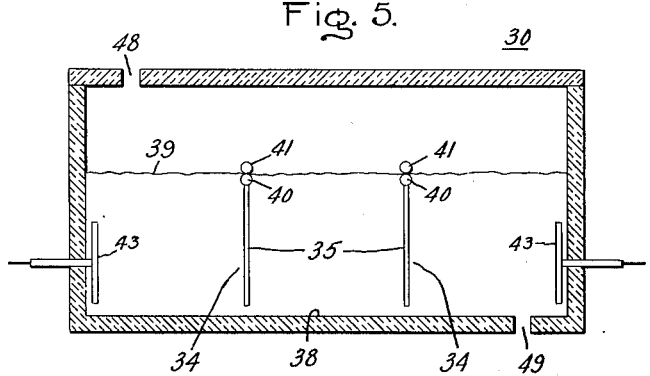

For a clearer and more complete understanding of my invention, reference should now be had to the accompanying drawing in which Figs. 1, 2 and 3 illustrate the invention embodied in a relatively small two compartment furnace, Figs. 4 and 5 illustrate the combined skimmer and electrode of my invention in a larger three compartment furnace, while Figs. 6 and 7, 8 and 9, and 10 and 11 illustrate modified embodiments of the invention.

Referring to Figs. 1, 2 and 3 of the drawing, there is shown a furnace 10 of a construction suitable for relatively small furnaces for limited production, and a combined skimmer and electrode 11 in accordance with my invention. The furnace 10 comprises two compartments, a first compartment 12 in which the raw materials are placed for melting and a second compartment 13 from which the molten glass is withdrawn. The two compartments are separated by skimmer and electrode 11 which comprises a flat rectangular member 14 of an electrically conductive heat resistant material such as molybdenum and a double tubular portion comprising hollow tubes 15 and 16 which are made of an electrically conductive heat resistant material which does not readily corrode in air at high temperatures, such as some steel alloys. Tube 16 and plate 14 are solidly joined along their common junction 17 while tubes 15 and 16 are likewise solidly joined along their abutting surfaces.

The electrode and skimmer 11 is positioned in furnace 10 so that the top of the molten glass, which is approximately at the dotted line 18, is slightly above joint 17 so that a plate 14 is always completely submerged and, therefore, not subject to oxidation by being exposed to the atmosphere. Member 11 is supported in the furnace in a pair of recesses 19 on opposite sides of chamber 12 at the end of the chamber which is joined to chamber 13.

The electrode and skimmer 11 is positioned closely adjacent the end of the chamber 12 from which chamber 13 projects and forms a barrier so that molten glass in order to flow from chamber 12 to 13 must pass beneath member 14. Member 11 thus serves as a skimmer and prevents impurities and incompletely melted glass which is lighter than completely melted glass and thus floats on it, from entering chamber 13.

A cooling fluid is circulated continuously through tubes 15 and 16 to keep them relatively cool and thus increase their life. Electrical connections (not shown) are provided to apply a potential between skimmer and electrode member 11 and a second electrode 20 at the opposite end of chamber 12 in order to pass current through the molten glass and raw materials in chamber 12 and thereby heat them.

It will be understood that while elongated tubular members 15 and 16 have upwardly offset end portions in the embodiment illustrated in Figs. 1-3 for engaging recesses 19 in the side walls of chamber 12, that the configuration of tubes 15 and 16 may be modified to conform to the requirements of the furnace with which the combined electrode and skimmer is to be used. It will also be understood that a single tubular member which is partially immersed in the charge along the effective portion adjacent joint 17 may be substituted for the pair of members 15 and 16, if desired; the use of a pair of tubular members as shown in Figs. 1-3 is generally less costly than a single tubular member of comparable dimensions, and also provides a skimmer and electrode member which has a smaller thickness, which is of advantage in some cases. Furthermore, the tubular members need not be of circular cross-section but may be of any desired cross-section.

In Figs. 4 and 5 there is illustrated a furnace 30 of a construction suitable generally for larger capacities than the furnace of Figs. 1-3. Furnace 30 has three compartments, a melting compartment 31, a refining compartment 32 and a pouring compartment 33. The three compartments are separated by two combined electrode and skimmer members 34. Each of the electrode and skimmer members comprises a flat rectangular plate 35 of heat resistant material positioned transversely between the side walls 36 and 37 of the furnace and separated slightly from the bottom 38 of the furnace to provide a passageway for molten glass. Thus members 35 provide in the furnace barriers having outer peripheries following approximately the inner contour of the furnace. The uppermost edges of the plates 35 are submerged slightly below the upper surface 39 of the molten glass and a pair of tubular members 40 and 41 of a dissimilar electrically conductive heat resistant material which does not readily corrode in air at high temperatures are solidly secured to each of the upper edges in a manner similar to the construction shown in Fig. 3, to prevent the flow of molten glass over member 35. In this case, tubular members 40 and 41 are straight and extend through suitable apertures 42 in the sides of the furnace to support the combined skimmer and electrode members. As in the previously described embodiment, a cooling fluid is circulated continuously through tubes 40 and 41 to increase the life of these tubes.

In addition to electrode and skimmer members 34, separating the furnace into three compartments, the furnace also has a plurality of electrodes 43 immersed in the charge in the furnace and positioned two each in compartments 31 and 33 respectively at the entrance and outlet ends of the furnace. Electrodes 43 in chamber 31 are connected to an electrical supply conductor 44 while the electrode 34 between chambers 31 and 32 is connected to a second supply conductor 45. The other electrode 34 is connected to a supply conductor 46 and the two remaining electrodes 43 in compartment 33 are connected to a supply conductor 47. The supply conductors 44—47 are connected to a suitable source of electrical potential (not shown) to provide current through the charge in the furnace compartments for melting and refining the glass.

Raw materials are added to the furnace through an aperture 48 over the melting compartment 31 and the refined molten glass is removed from the furnace through another aperture 49 in the bottom of compartment 33, it being understood that opening 49 may be provided with a variable gate if desired in order to control the flow of molten glass out of the furnace.

It will thus be seen that the combination skimmer and electrode members 34 act as skimmers to prevent the flow of impurities and incompletely melted glass through the furnace in the same manner as described in connection with member 11 in Figs. 1-3, and at the same time these members serve as electrodes to provide for the flow of heating current through the furnace. In a typical furnace the outside diameter of tubes 40 and 41 may be approximately 1 inch, therefore, it can readily be seen that the combined skimmer and electrode members of my invention occupy far less space than the brick baffles which have been used heretofore as skimmers, which means that the overall size of the furnace can be made considerably smaller for a specified output of molten glass by the use of my invention.

Figure 6:
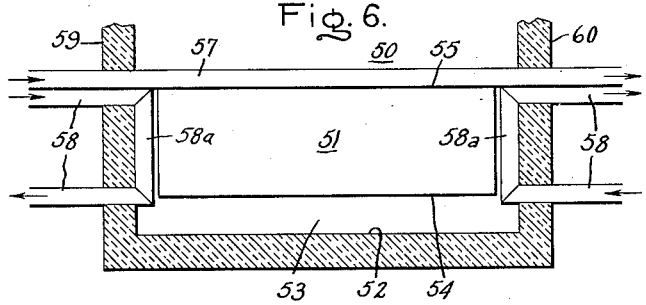
Figure 7:
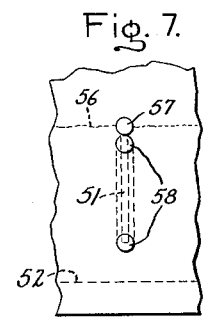

Another modified embodiment of my invention is illustrated in Figs. 6 and 7 of the drawing. In these figures there is illustrated a combined skimmer and electrode device which provides for cooling the side walls of the furnace in addition to the other features provided by previously discussed embodiments of the invention. This combined skimmer and electrode, which is designated generally by the numeral 50 in Figs. 6 and 7, comprises a flat rectangular member 51 of heat resistant material positioned transversely of the furnace and vertically within the molten glass with the bottom edge 54 of member 51 separated from the bottom surface 52 of the furnace to provide an opening 53 through which the molten glass may flow. The top edge 55 of member 51 is slightly below the upper surface 56 of the molten glass. Positioned along the edge 55 and joined solidly thereto is a straight tubular member 57 of a material which is resistant to corrosion by the atmosphere at the temperatures encountered in the melting of glass. The electrode and skimmer member 50 also includes a pair of U-shaped tubular members 58 positioned on opposite sides of the furnace with the bight portions 58a of the U-shaped members adjacent to or partly imbedded in the inner surfaces of the side walls 59 and 60 of the furnace. A suitable cooling fluid is circulated continuously through tubular member 57 and tubular members 58 which project through suitable apertures through the furnace walls 59 and 60. This cooling fluid removes some of the heat present in the molten glass adjacent members 57 and 58 thus increasing the life of members 57 and 58 and also increasing the life of the portions of the furnace walls adjacent tubular members 58.

Figure 8:
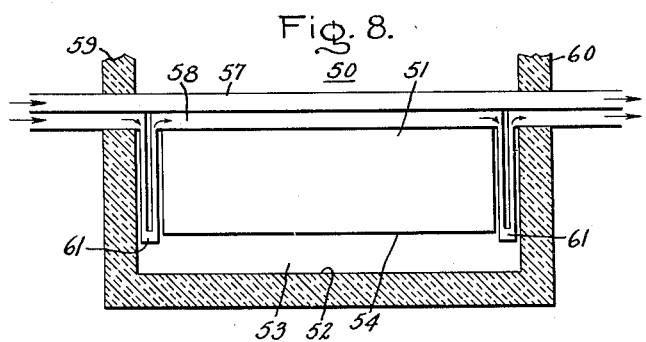
Figure 9:
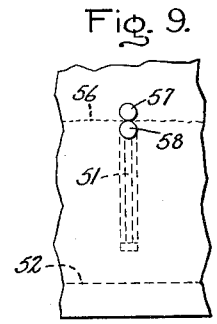

Another embodiment of my invention similar to that of Figs. 6 and 7 is illustrated in Figs. 8 and 9 of the drawing in which like parts bear like reference numerals with corresponding parts in Figs. 6 and 7. In this embodiment member 58 is changed so that it forms a second tubular conductor along the upper surface of the molten glass between members 57 and 51, while at each end of skimmer and electrode device 50 member 58 has a depending U-shaped portion 61 positioned between member 51 and the side walls 59 and 60 of the furnace. The effect of this construction, like that illustrated in Figs. 6 and 7, is to keep the side walls cooler adjacent the combined skimmer and electrode device thus prolonging the life of these portions of the side walls, in addition to acting as a skimmer and as an electrode.

Figure 10:
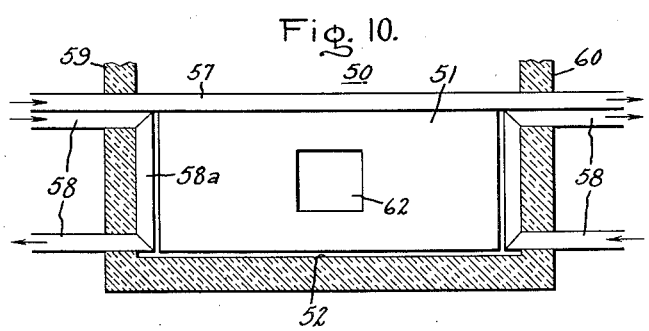
Figure 11:
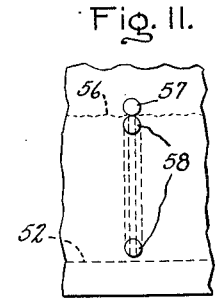

Another modified embodiment of the invention, which is also similar to Figs. 6 and 7, is illustrated in Figs. 10 and 11 of the drawing. In this embodiment member 51 extends almost to the bottom surface 52 of the furnace and an opening 62 is provided in member 51 through which the molten glass flows from one compartment to another. This embodiment has U-shaped members 58 to provide protection for the side walls of the furnace in addition to the other features of the combined skimmer and electrode construction of this invention.

It will be understood from the foregoing description that this invention provides a combined skimmer and electrode which in addition to providing skimming action and means for producing electric current for heating the charge in the furnace also provides protection for the side walls of the furnace adjacent the skimmer and electrode device in some forms. My invention also makes possible a reduction in the overall size of the furnace as previously discussed. In addition it should be pointed out that the heat loss due to the use of this device is generally less than when an air duct is used. Some heat is removed from the furnace by the cooling fluid in the tubes of my combined skimmer and electrode device but it has been found that this heat is generally less than that removed by the air ducts of the brick wall type of construction because of the much smaller cross-sectional area which is involved.

While I have illustrated certain preferred embodiments of my invention, modifications thereof may be made by those skilled in the art and it should, therefore, be understood that I intend to cover by the appended claims any such modifications which fall within the true spirit and scope of my invention.

What I claim as new and desire to secure by Letters Patent of the United States is:

1. In a continuous electric glass melting furnace having a plurality of consecutively arranged compartments, a combined electrode and skimmer positioned transversely of said furnace and separating two of said compartments, said combined electrode and skimmer comprising a flatly disposed member of electrically conductive heat resistant material having an outer periphery following approximately the inner contour of said furnace, the upper edge of said flatly disposed member being positioned slightly below the surface of the charge in said furnace, said flatly disposed member providing an opening in the lower portion of the furnace for the movement of the lower strata of the charge from one compartment to another, and at least one hollow tubular member of heat resistant electrically conductive material positioned along said upper edge and secured thereto, said tubular member being partially submerged in said charge whereby the flow of said charge over said flatly disposed member is prevented, said tubular member engaging the walls on both sides of said furnace to provide support for said combined electrode and skimmer, and two additional hollow tubular members disposed along the inside surfaces of the side walls of said furnace adjacent the side edges of said flatly disposed member, means providing for the flow of cooling fluid through said tubular member during the operation of said furnace, and electrical connections to the combined skimmer and electrode for the energization thereof.

2. A combined electrode and skimmer for an electric glass melting furnace, comprising a flat molybdenum member adapted to be positioned in vertically disposed relation completely submerged in the charge in the furnace with its upper edge slightly below the surface of said charge, said molybdenum member being of such length as to extend substantially completely across the path of flow of said charge, a hollow tubular member of steel of a composition having a relatively high resistance to corrosion by the atmosphere at the elevated temperatures encountered in a glass melting furnace positioned along said edge of said molybdenum and secured thereto, said steel tubular member being partially submerged in said charge whereby it forms with said molybdenum member a skimmer for said charge, said steel tubular member being arranged for the flow of a cooling fluid therethrough, and electrical connection means for the combined skimmer and electrode.

3. In a continuous electric glass melting furface of elongated construction having a plurality of consecutively arranged compartments and arranged for the insertion of raw material near one end and the withdrawal of molten glass near the other, a combined electrode and skimmer member positioned transversely of said furnace and separating two of said compartments, said combined electrode and skimmer member comprising a flatly disposed piece of molybdenum having an outer periphery following approximately the inner contour of said furnace, the upper edge of said molybdenum member being positioned slightly below the surface of the molten glass, said molybdenum member having an opening therethrough in the lower portion of the furnace, at least one hollow tubular member of alloy steel positioned along said upper edge and secured thereto, said tubular member being partially submerged in the molten glass whereby the flow of molten glass over said molybdenum member is prevented, said steel member and said molybdenum member jointly providing a barrier to the flow of glass between said two compartments except through said opening, said tubular member projecting through the walls on both sides of said furnace to provide support for said combined electrode and skimmer, means providing for the flow of cooling fluid through the said tubular member continuously during the operation of said furnace, and electrical connection means for the combined skimmer and electrode.

4. A continuous electric glass melting furnace comprising bottom and side walls forming a first melting compartment for the insertion of raw materials and a second communicating compartment from which molten glass is withdrawn, a tubular member made of electrically conductive heat resistant material extending across and supported on opposite ones of said side walls at the junction of said compartments and having its lower edge extending below the surface of the molten glass in said compartments, means for passing a cooling fluid through said tubular member, a substantially rectangular plate electrode made of electrically conductive heat resistant material having an upper edge solidly joined to the lower edge of said tubular member so as to be supported by said tubular member and hang therefrom downward with its upper edge below the surface of the molten glass in said compartments so as to be completely submerged therein, said plate electrode extending substantially completely across the side walls of said second compartment but having its lower edge spaced from said bottom wall thereby to form with said tubular member a combined electrode and skimmer barrier wall between said compartments providing for the flow of molten glass into said second compartment only through the space below said plate electrode, at least one additional electrically conducting electrode in said melting compartment in contact with the molten glass, and electric connections for connecting said electrodes to an electric supply source.

GORDON C. NONKEN.

References Cited in the file of this patent

UNITED STATES PATENTS

| Number | Name | Date |
|---|---|---|
| 732,616 | Burgess et al. | June 30, 1903 |
| 1,593,054 | Arbeit | July 20, 1926 |
| 1,594,496 | Clark | Aug. 3, 1926 |
| 1,601,703 | Patterson | Sept. 28, 1926 |
| 1,761,342 | Hitner | June 3, 1930 |
| 1,820,248 | Raeder | Aug. 25, 1931 |
| 2,089,690 | Cornelius | Aug. 10, 1937 |
| 2,225,616 | Borel | Dec. 24, 1940 |
| 2,244,267 | Slayter et al. | June 3, 1941 |
| 2,274,986 | Kilian et al. | Mar. 3, 1942 |
| 2,277,679 | Borel | Mar. 31, 1942 |
| 2,293,948 | Peyches | Aug. 25, 1942 |
| 2,310,635 | Hopkins | Feb. 9, 1943 |
| 2,360,373 | Tiede | Oct. 17, 1944 |
| 2,377,772 | Fletcher et al. | June 5, 1945 |

FOREIGN PATENTS

| Number | Country | Date |
|---|---|---|
| 65,520 | Norway | June 7, 1943 |